US011985279B2

(12) United States Patent
Fukaya

(10) Patent No.: US 11,985,279 B2
(45) Date of Patent: May 14, 2024

(54) INFORMATION PROCESSING OF USER FEEDBACK USING IMAGE FORMING APPARATUS

(71) Applicant: Toshiba Tec Kabushiki Kaisha, Tokyo (JP)

(72) Inventor: Hideaki Fukaya, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/323,087

(22) Filed: May 24, 2023

(65) Prior Publication Data
US 2024/0048661 A1 Feb. 8, 2024

(30) Foreign Application Priority Data
Aug. 5, 2022 (JP) .................. 2022-125684

(51) Int. Cl.
*G03G 15/00* (2006.01)
*G06F 15/00* (2006.01)
*H04N 1/00* (2006.01)

(52) U.S. Cl.
CPC ..... *H04N 1/00474* (2013.01); *H04N 1/00039* (2013.01); *H04N 1/00403* (2013.01)

(58) Field of Classification Search
None
See application file for complete search history.

(56) References Cited

U.S. PATENT DOCUMENTS

| 6,701,095 | B1 | 3/2004 | Fujimoto et al. |
| 6,950,613 | B2 | 9/2005 | Fujimoto et al. |
| 7,146,111 | B2 | 12/2006 | Fujimoto et al. |
| 11,763,919 | B1* | 9/2023 | Jain ........ G16H 40/63 715/221 |
| 2005/0078967 | A1* | 4/2005 | Fujimoto ........ G03G 15/5079 399/9 |
| 2022/0263951 | A1* | 8/2022 | Miyazaki ........ H04N 1/00029 |

FOREIGN PATENT DOCUMENTS

| JP | 2000-338825 A | 12/2000 |
| JP | 2019-116007 A | 7/2019 |
| JP | 2021-131603 A | 9/2021 |

* cited by examiner

*Primary Examiner* — Andrew H Lam
(74) *Attorney, Agent, or Firm* — Kim & Stewart LLP

(57) ABSTRACT

According to an embodiment, an image forming apparatus displays a questionnaire regarding an apparatus on a control panel. The image forming apparatus acquires answer data to the questionnaire from a user via a touch panel of the control panel. The image forming apparatus acquires related data regarding the apparatus. The image forming apparatus associates the related data with the answer data to transmit the answer data and the related data to another apparatus different from the apparatus.

9 Claims, 7 Drawing Sheets

Fig.3

| Function used | Question-naire information | Question-naire result | Sound data | Scan-related information | Print-related information | Image data | Detection data |
|---|---|---|---|---|---|---|---|
| Scan | Acquired | Unsatis-factory | Trans-mitted | Trans-mitted by batch | Not trans-mitted | Not trans-mitted | Trans-mitted by batch (20°C50%) |
| Copy | Not acquired | Absent | Not trans-mitted | Not trans-mitted | Not trans-mitted | Not trans-mitted | Not trans-mitted |
| Cooling (air condit-ioning) | Acquired | Satis-factory | Trans-mitted | Not trans-mitted | Not trans-mitted | Trans-mitted by batch | Trans-mitted by batch (21°C35%) |

INFORMATION PROCESSING OF USER FEEDBACK USING IMAGE FORMING APPARATUS

CROSS-REFERENCE TO RELATED APPLICATION

This application is based upon and claims the benefit of priority from the prior Japanese Patent Application No. 2022-125684, filed on Aug. 5, 2022, the entire contents of which are incorporated herein by reference.

FIELD

An embodiment described herein generally relates to an image forming apparatus and an information processing method for the image forming apparatus.

BACKGROUND

In image forming apparatuses, there is known a technology of allowing a user to determine to which of an image quality and a print speed priority is given and of automatically setting various conditions of the image forming apparatus to be optimal.

However, in order to make it possible to automatically set the conditions to be optimal as described above, it has been necessary for a user to answer a plurality of questionnaires about user's preference.

BRIEF DESCRIPTION OF THE DRAWINGS

FIG. 3 is a table exemplifying data transmitted by the image forming apparatus according to the embodiment.

DETAILED DESCRIPTION

Figure 1:
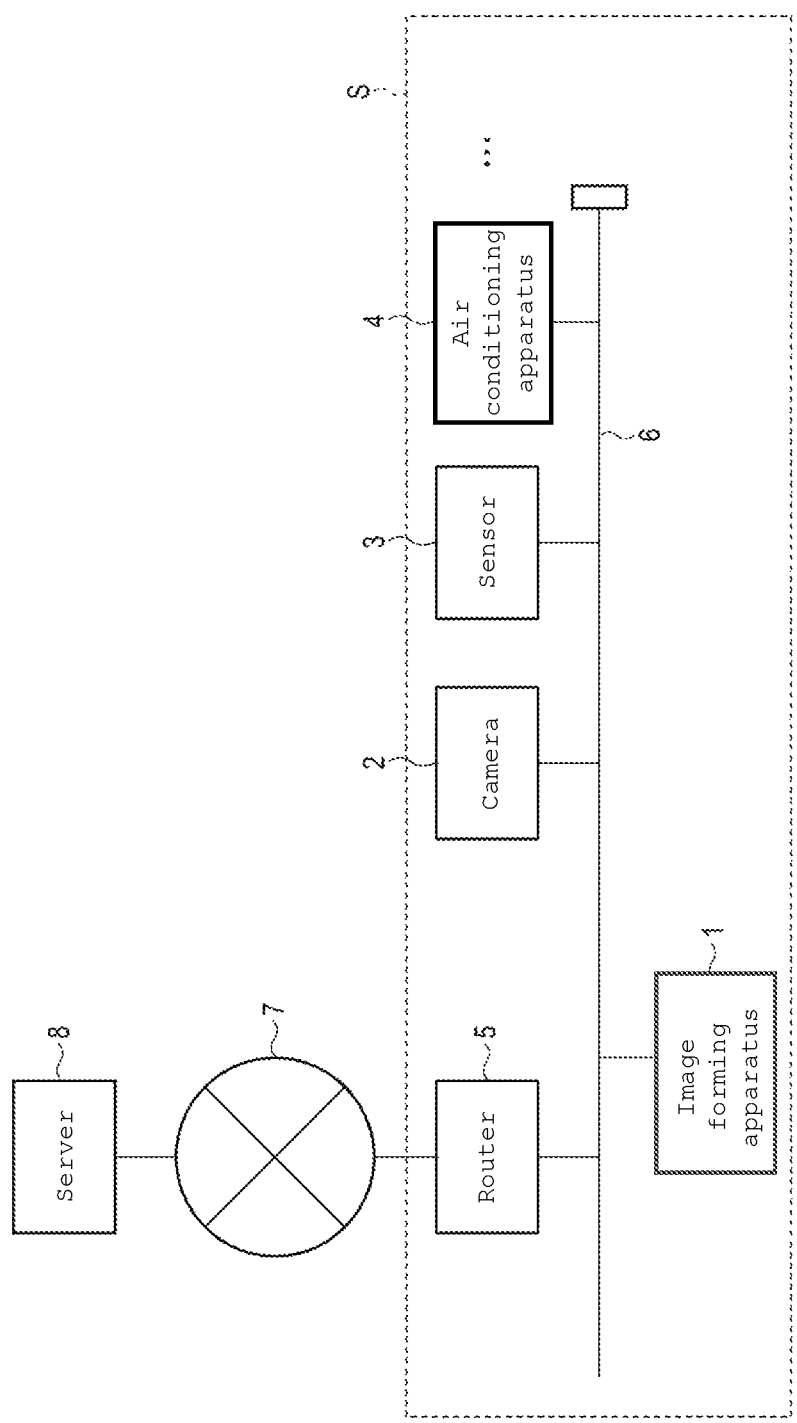
FIG. 1 is a block diagram showing an outline of a system including an image forming apparatus according to an embodiment.

According to one embodiment, an image forming apparatus includes a control panel, an input/output interface, and a controller. The control panel includes a touch panel capable of inputting an instruction based on an operation of a user. The input/output interface transmits various types of data to another apparatus. The controller displays a questionnaire regarding an apparatus to the user on the control panel. The controller acquires answer data to the questionnaire from the user via the touch panel. The controller acquires related data regarding the apparatus. Further, the controller associates the related data with the answer data to transmit the answer data and the related data to another apparatus different from the apparatus via the input/output interface.

Hereinafter, an embodiment will be described with reference to the drawings. In the drawings, the same constituent elements will be denoted by the same reference symbols as much as possible, and overlapping description thereof will be omitted.

Configuration Example

FIG. 1 is a block diagram exemplifying a communication system S according to an embodiment. The communication system S includes an image forming apparatus 1, a camera 2, a sensor 3, an air conditioning apparatus 4, and a router 5. The image forming apparatus 1, the camera 2, the sensor 3, the air conditioning apparatus 4, and the router 5 are communicably connected to each other via a network 6. For example, the network 6 is a local area network (LAN) or the like. The LAN may be a wireless LAN or wired LAN. FIG. 1 exemplifies the air conditioning apparatus 4, but the communication system S may include another apparatus such as an IT/network device that cooperates with the image forming apparatus 1. The communication system S may mean a system including at least two electronic apparatuses. The communication system S is an example of an information processing system.

The image forming apparatus 1 is an electronic apparatus having an electrophotographic print function. The image forming apparatus 1 will be described as a multifunction peripheral (MFP) having a copy function, a print function, a facsimile (FAX) function, a scan function, and the like. A configuration example of the image forming apparatus 1 will be described later.

The camera 2 acquires image data in an imaging range. The camera 2 outputs the acquired image data to the image forming apparatus 1 or a server 8.

The sensor 3 outputs data acquired in a detection range. The sensor 3 outputs the acquired sensing data to the image forming apparatus 1 or the server 8. For example, the sensor 3 may be a sensor such as an infrared ray sensor or a depth sensor. Alternatively, the sensor 3 may be another sensor. The sensor 3 is an example of a sensing device.

The air conditioning apparatus 4 is an electronic apparatus that operates in cooperation with the image forming apparatus 1. The air conditioning apparatus 4 is an example of an apparatus different from the image forming apparatus 1.

The router 5 relays data communication between the network 6 and a network 7. For example, the network 7 is the Internet. The image forming apparatus 1 is communicable with the server 8 via the network 7. The server 8 is an electronic apparatus having an information processing function. The server 8 is an example of another apparatus.

Figure 2:
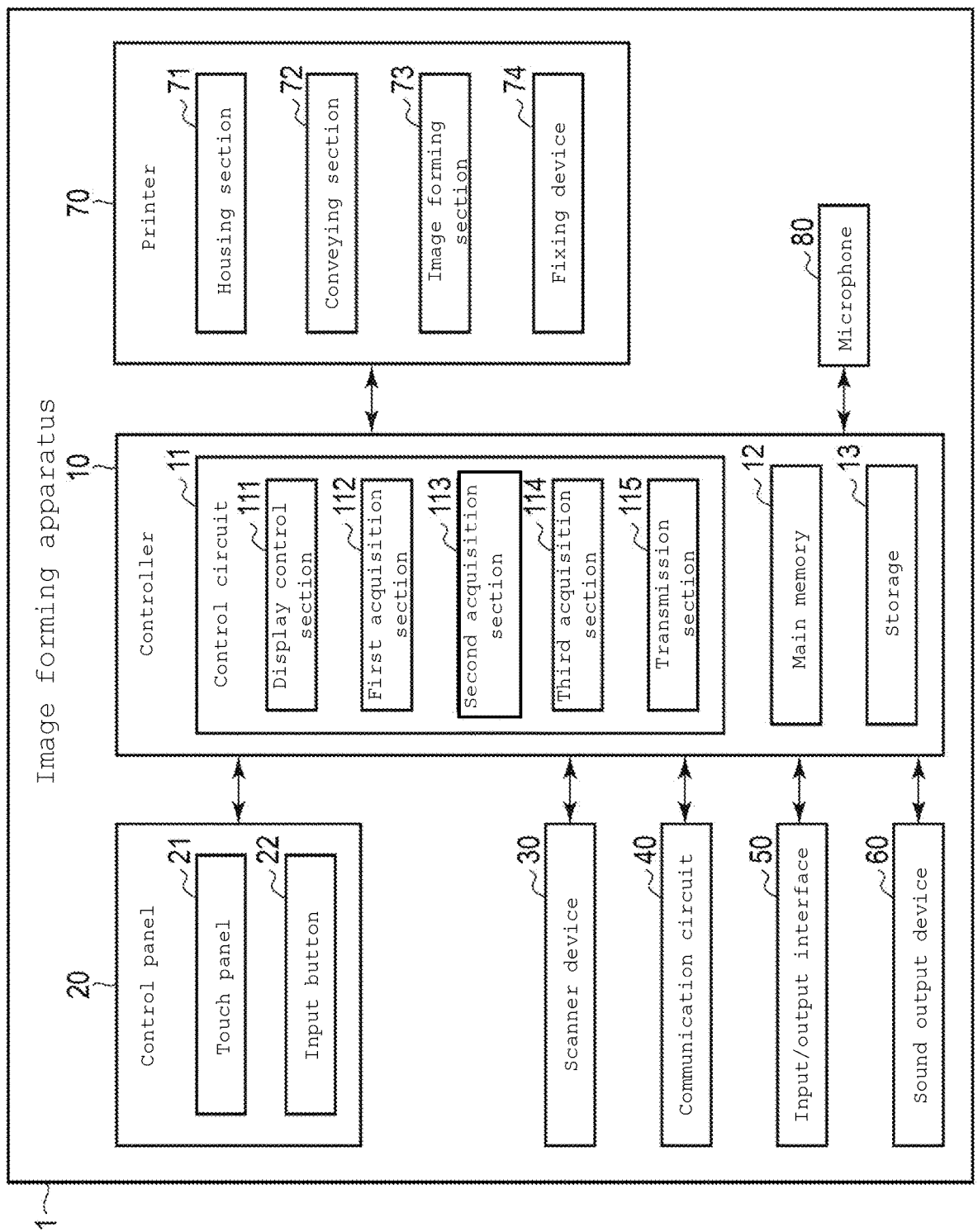
FIG. 2 is a block diagram showing the image forming apparatus according to the embodiment.

FIG. 2 is a block diagram showing an outline of the configuration example of the image forming apparatus 1 according to the embodiment. The image forming apparatus 1 is an electronic apparatus having an electrophotographic print function. The image forming apparatus 1 will be described as an MFP having a copy function, a print function, a facsimile function, a scan function, and the like.

The image forming apparatus 1 includes a controller 10, a control panel 20, a scanner device 30, a communication circuit 40, an input/output interface 50, a sound output device 60, a printer 70, and a microphone 80.

The controller 10 controls the operations of the respective units of the image forming apparatus 1. The controller 10 includes a control circuit 11, a main memory 12, and a storage 13.

The control circuit 11 corresponds to the central portion of the image forming apparatus 1. The control circuit 11 is an element constituting the computer of the image forming apparatus 1. The control circuit 11 includes a processor such as a central processing unit (CPU). The control circuit 11 includes, in addition to the CPU or instead of the CPU, an application specific integrated circuit (ASIC), a field programmable gate array (FPGA), a graphics processing unit (GPU), or the like. The control circuit 11 expands programs stored in advance in the main memory 12 or the storage 13 in the main memory 12. The control circuit 11 executes the programs expanded in the main memory 12 to execute various types of processing. The programs are programs for implementing the units to be described later in the control circuit 11 and causing the control circuit 11 to execute processing of each unit.

The main memory 12 corresponds to the main memory portion of the image forming apparatus 1. The main memory 12 is an element constituting the computer of the image forming apparatus 1. The main memory 12 includes a non-volatile memory area and a volatile memory area. The main memory 12 stores an operating system or a program in the non-volatile memory area. The volatile memory area of the main memory 12 is used as a work area in which data is appropriately rewritten by the control circuit 11. For example, the main memory 12 includes a read only memory (ROM) as the non-volatile memory area. For example, the main memory 12 includes a random-access memory (RAM) as the volatile memory area.

The storage 13 corresponds to the auxiliary storage portion of the image forming apparatus 1. The storage 13 is an element constituting the computer of the image forming apparatus 1. For example, the storage 13 includes a hard disk drive (HDD). The storage 13 may include a semiconductor storage medium such as a solid state drive (SSD), in addition to the HDD or instead of the HDD. The storage 13 stores the above-mentioned programs, data used by the control circuit 11 to perform various types of processing, and data generated by the processing of the control circuit 11. The storage 13 is an example of a storage device.

The control panel 20 includes a touch panel 21 and an input button 22.

The touch panel 21 is a device capable of displaying an image and inputting an instruction based on a user operation on the touch panel 21. The touch panel 21 includes a display device capable of displaying an image. The display device is a liquid crystal display, an organic electroluminescence (EL) display, or the like, but the display device is not limited thereto. The touch panel 21 includes an input device that is stacked on the display device and is capable of inputting an instruction based on a user operation on the touch panel 21. The user operation on the touch panel 21 is a user operation associated with a touch on the touch panel 21. The touch panel 21 is also referred to as a touch screen.

The input button 22 is a button that can be pressed down, such as a print start button. The input button 22 is an interface capable of inputting an instruction based on a user operation on the input button 22.

The scanner device 30 is a device that reads images such as letters, figures, and photographs provided on a sheet placed at a predetermined position. The scanner device 30 includes a line sensor. The line sensor may have a charge coupled device (CCD) system. The line sensor may also have a contact image sensor (CIS) system. The scanner device 30 generates image data based on an image read by using the line sensor. The scanner device 30 transmits the generated image data to the controller 10. The controller 10 saves the received image data in the storage 13 or transmits the received image data to the printer 70.

The communication circuit 40 is an interface for connecting the image forming apparatus 1 and a user terminal so as to be communicable with each other via a wired or wireless network. For example, the user terminal is a personal computer (PC) or the like, but it is not limited thereto.

The input/output interface 50 is an interface for connecting the image forming apparatus 1 and an external apparatus to each other. The input/output interface 50 includes a connector of a cable. For example, the external apparatus is a sound output device, but it is not limited thereto.

The sound output device 60 is a device capable of outputting a sound by the control of the control circuit 11. For example, the sound output device 60 is a speaker.

The printer 70 is a unit that forms an image on a sheet. The printer 70 forms an image on a sheet by the print function on the basis of image data transmitted from the user terminal via a network. The printer 70 forms an image on a sheet by the copy function on the basis of image data generated by the scanner device 30. Here, the printer 70 using a tandem-type toner image transfer unit will be described as an example. The printer 70 includes a housing section 71, a conveying section 72, an image forming section 73, and a fixing device 74.

The housing section 71 houses sheets. The housing section 71 includes a paper feed cassette and a pickup roller. The paper feed cassette houses sheets. The pickup roller takes out sheets one by one from the paper feed cassette. The pickup roller supplies the taken sheet to the conveying section 72.

The conveying section 72 conveys the sheet in the printer 70. The conveying section 72 includes a plurality of rollers and a resist roller. The plurality of rollers include a roller that conveys the sheet supplied by the pickup roller to the resist roller. The plurality of rollers include a roller that is provided on the downstream side of the fixing device 74, which will be described later, and feeds the sheet to a paper feed tray. The resist roller conveys the sheet to a transfer section of the image forming section 73, which will be described later, at a timing at which the transfer section transfers a toner image onto the sheet.

The image forming section 73 forms a toner image onto the sheet. The image forming section 73 includes an intermediate transfer belt, a plurality of image forming units, an exposure device, the transfer section, and the like. The intermediate transfer belt is an endless belt. The plurality of image forming units include units corresponding to the number of types of toner. The plurality of image forming units include a black developing unit, a cyan image forming unit, a magenta image forming unit, and a yellow image forming unit. Each image forming unit includes a photosensitive drum. Each image forming unit includes a charger, a developing device, a primary transfer roller, a cleaning unit, and a destaticizer in the periphery of the photosensitive drum. The photosensitive drum is a drum including a photosensitive layer on its surface. The charger uniformly charges the photosensitive layer on the surface of the photosensitive drum. The developing device develops an electrostatic latent image located on the surface of the photosensitive drum by the toner. The developing device forms a toner image on the surface of the photosensitive drum. The primary transfer roller faces the photosensitive drum and sandwiches the intermediate transfer belt therebetween. The primary transfer roller transfers the toner image, which is located on the surface of the photosensitive drum, onto the intermediate transfer belt. The cleaning unit removes the toner not transferred and remaining on the surface of the photosensitive drum. The destaticizer irradiates the surface of the photosensitive drum with light. The destaticizer destaticizes the photosensitive layer of the photosensitive drum by light irradiation. The exposure device irradiates the surface of the photosensitive drum of each image forming unit with laser light via an optical system such as a polygonal mirror. The exposure device forms an electrostatic pattern as an electrostatic latent image on the surface of the photosensitive drum. The transfer section transfers the charged toner image, which is located on the surface of the intermediate transfer belt, onto the sheet. The transfer section includes a support roller and a secondary transfer roller that are constituted so as to sandwich the intermediate transfer belt and the sheet therebetween from both side in the thickness direction.

The fixing device 74 applies heat and pressure to the sheet, on which the toner image is formed and which is supplied from the image forming section 73. The fixing device 74 fixes the toner image, which is formed on the sheet, onto the sheet by heat and pressure.

The microphone 80 is a device capable of inputting a sound by the control of the control circuit 11.

Note that the hardware configuration of the image forming apparatus 1 is not limited to the configuration described above. The image forming apparatus 1 can appropriately omit and change the components described above and add new components. The image forming apparatus 1 does not necessarily include the sound output device 60. The sound output device 60 may be connected to the image forming apparatus 1 via the input/output interface 50. The image forming apparatus 1 does not necessarily include the microphone 80. The microphone 80 may be connected to the image forming apparatus 1 via the input/output interface 50.

Each section implemented by the control circuit 11 described above will be described. The control circuit 11 implements a display control section 111, a first acquisition section 112, a second acquisition section 113, a third acquisition section 114, and a transmission section 115. Each section implemented by the control circuit 11 can also be referred to as each function. Each section implemented by the control circuit 11 can also be implemented by a control unit including the control circuit 11 and the main memory 12.

The display control section 111 displays a questionnaire regarding an apparatus on the touch panel 21. The apparatus may be the image forming apparatus 1 or an apparatus that is different from the image forming apparatus 1 and is connected to the image forming apparatus 1 via the network 6. The apparatus different from the image forming apparatus 1 is, for example, the air conditioning apparatus 4. The apparatus different from the image forming apparatus 1 may be a plurality of apparatuses. The questionnaire regarding the apparatus includes a questionnaire regarding a function of the apparatus. The function includes functions of copy, scan, print, FAX transmission/reception, and the like. The function includes functions of cooling, heating, humidification, dehumidification, and the like. The function may differ depending on the apparatus. The questionnaire regarding the apparatus may be one question, for which an answer is input by selecting an option. The questionnaire regarding the apparatus includes a questionnaire regarding use of the apparatus. The questionnaire regarding use of the apparatus includes a questionnaire regarding feedback of a user when using the apparatus. The feedback on the use includes, for example, "satisfactory" and "unsatisfactory". If the apparatus is the air conditioning apparatus 4, the feedback on the use may include, for example, "hot", "cold", and "comfortable". The display control section 111 may display the questionnaire on the touch panel 21 in response to the fact that the user has used the image forming apparatus 1. The display control section 111 may display the questionnaire on the touch panel 21 in response to the fact that the user has selected cooperation between the image forming apparatus 1 and an apparatus different from the image forming apparatus 1. The display control section 111 may display the questionnaire on the touch panel 21 in response to the fact that the user has approached the image forming apparatus 1. The display control section 111 may display the questionnaire on the touch panel 21 on the basis of a detection result by a motion sensor or the like connected to the image forming apparatus 1. In the following description, the phrase "in response to" may be replaced with "on the basis of".

The first acquisition section 112 acquires answer data to the questionnaire. The first acquisition section 112 determines whether the user is satisfactory or unsatisfactory for the function of the apparatus on the basis of the answer data. The second acquisition section 113 acquires related data regarding the apparatus. The related data includes various types of setting information associated with the function of the apparatus. In the case of the scan function, the setting information includes, for example, a read speed, image data at reading, settings for image processing, and log information. In the case of the copy function, the setting information includes, for example, information set at the time of image formation, such as a conveying direction of a medium on which an image is formed, double-sided/one-side printing, an enlargement/reduction setting, and a concentration setting, settings for image processing, and log information. In the case of the cooling function, the setting information includes, for example, a temperature setting, an air volume setting, a mode setting, and log information. The related data includes sensing data around the apparatus. The sensing data includes, for example, image data acquired by the camera 2 and detection data detected by the sensor 3. The image data may include image data indicating a population density based on presence information, image data indicating open/close of windows, and the like. The detection data may include data of temperature, humidity, and the like. The second acquisition section 113 may determine related data to be acquired on the basis of contents of the answer data.

The third acquisition section 114 acquires sound data around the apparatus. The sound data includes various types of sound data acquired via the microphone 80. For example, the sound data includes data of a voice uttered by the user. The voice uttered by the user includes, for example, feedback on the use of the apparatus, such as "the operation is slow", "the printed image or scanned image has a different hue from that of the original document", and "the paper is wrinkled". If the apparatus is the air conditioning apparatus 4, the voice uttered by the user may include, for example, "hot", "cold", and "comfortable". The sound data includes, for example, data of an operating sound of the apparatus. The third acquisition section 114 may acquire the sound data on the basis of the fact that the user permits recording.

The transmission section 115 transmits various types of data to the server 8 via the input/output interface 50. The transmission section 115 transmits the answer data acquired by the first acquisition section 112 to the server 8. The transmission section 115 associates the answer data with the related data acquired by the second acquisition section 113 and then transmits the resultant data to the server 8. The transmission section 115 associates the answer data with the sound data acquired by the third acquisition section 114 and then transmits the resultant data to the server 8. The transmission section 115 may transmit at least one of the answer data, the related data, or the sound data to the server 8. The transmission section 115 determines related data to be transmitted on the basis of the contents of the answer data. For example, if the answer data indicates "satisfactory", the transmission section 115 may transmit part of the related data to the server 8. If the answer data indicates "unsatisfactory", the transmission section 115 may transmit all of the related data to the server 8. The transmission section 115 may transmit the sound data to the server 8 on the basis of the fact that the user permits recording. The transmission section 115 may transmit part of the sound data to the server 8 on the basis of the fact that the user permits recording. The transmission section 115 may determine whether to transmit the sound data or not on the basis of the contents of the answer data. For example, if the answer data indicates "satisfactory", the transmission section 115 may transmit part of the sound data to the server 8. If the answer data indicates "unsatisfactory", the transmission section 115 may transmit all of the sound data to the server 8. If the answer data indicates "satisfactory", the transmission section 115 may determine not to transmit the sound data to the server 8. If the answer data indicates "unsatisfactory", the transmission section 115 may determine to transmit the sound data to the server 8. In the following description, the word "transmit" may be replaced with "output".

Examples of a questionnaire result and data to be transmitted will be described. FIG. 3 is a table exemplifying data to be transmitted by the image forming apparatus 1 according to the embodiment.

FIG. 3 shows examples of the answer data, the related data, and the sound data with respect to the questionnaire transmitted from the image forming apparatus 1 to another apparatus. The table of FIG. 3 includes records in which a function used by a user, information on whether a questionnaire is acquired or not, information indicating a questionnaire result, sound data transmission information, and related data transmission information are associated with each other. The function used by a user includes, for example, a function of the image forming apparatus 1 and a function of the air conditioning apparatus 4 that cooperates with the image forming apparatus 1. The information on whether a questionnaire is acquired or not is information indicating whether the first acquisition section 112 has acquired answer data to the questionnaire or not. The information indicating a questionnaire result is information indicating contents of the answer data acquired by the first acquisition section 112. The contents of the answer data include feedback of the user when the user uses the apparatus, such as "satisfactory" and "unsatisfactory". The answer data acquired by the first acquisition section 112 includes the information on whether a questionnaire is acquired or not and the information indicating a questionnaire result. The sound data transmission information is information indicating whether the sound data is transmitted or not. The related data transmission information is information indicating whether the related data is transmitted or not. The related data includes setting information, image data, and detection data. Transmission information regarding the setting information may be set for each function. For example, the related data may include information indicating whether scan-related information indicating setting information regarding the scan function is transmitted or not, and whether print-related information indicating setting information regarding the print function is transmitted or not.

For example, a case where the scan function of the image forming apparatus 1 is used will be described. FIG. 3 shows that, for the scan function, the information on whether a questionnaire is acquired or not is "acquired", the questionnaire result is "unsatisfactory". In this case, FIG. 3 shows that, for the scan function, the sound data is "transmitted", the scan-related information is "transmitted by batch", the print-related information is "not transmitted", the image data is "not transmitted", and the detection data is "transmitted by batch". Since the questionnaire result for the scan function is "unsatisfactory", the transmission section 115 associates the answer data with the sound data, the scan-related information, and the detection data to transmit the resultant data to the server 8. The transmission section 115 may select data to be transmitted in association with the answer data on the basis of the questionnaire result. For example, if the questionnaire result is "satisfactory", the transmission section 115 may associate the answer data with the scan-related information only, to transmit the resultant data to the server 8. The transmission section 115 may transmit the answer data only.

A case where the copy function of the image forming apparatus 1 is used will be described. FIG. 3 shows, for the copy function, the information on whether a questionnaire is acquired or not is "not acquired", and the questionnaire result is "absent". In this case, FIG. 3 shows, for the copy function, the sound data is "not transmitted", the scan-related information is "not transmitted", the print-related information is "not transmitted", the image data is "not transmitted", and the detection data is "not transmitted". Since the questionnaire result for the copy function is not acquired, the transmission section 115 does not transmit the sound data and the related data to the server 8. Note that the transmission section 115 may transmit the sound data and the related data to the server 8 even if the questionnaire result is not acquired.

A case where the cooling function of the air conditioning apparatus 4 is used will be described. FIG. 3 shows, for the cooling function, the information on whether a questionnaire is acquired or not is "acquired", and the questionnaire result is "satisfactory". In this case, FIG. 3 shows that, for the cooling function, the sound data is "transmitted", the scan-related information is "not transmitted", the print-related information is "not transmitted", the image data is "transmitted by batch", and the detection data is "transmitted by batch". In this example, the transmission section 115 associates the answer data with the sound data and the detection data to transmit the resultant data to the server 8. The transmission section 115 may select data to be transmitted in association with the answer data on the basis of the questionnaire result. For example, if the questionnaire result is "satisfactory", the transmission section 115 may transmit the answer data only or may associate the answer data with the detection data only to transmit the resultant data to the server 8. If the questionnaire result is "unsatisfactory", the transmission section 115 may associate the answer data with the sound data, the image data, and the detection data to transmit the resultant data to the server 8.

Figure 4:
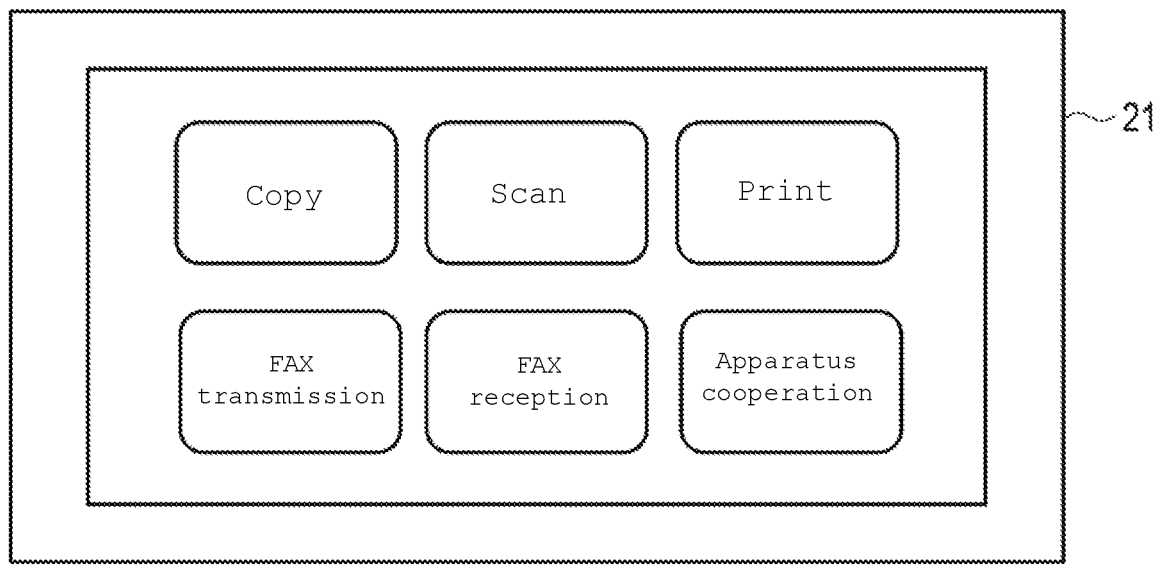
FIG. 4 is a diagram showing an example of a function selecting image displayed on a touch panel of the image forming apparatus according to the embodiment.

An image displayed on the touch panel of the image forming apparatus 1 will be described. FIG. 4 is a diagram showing an example of a function selecting image displayed on the touch panel 21 of the image forming apparatus 1 according to the embodiment.

The function selecting image shown in FIG. 4 includes selection buttons indicating functions of copy, scan, print, FAX transmission, FAX reception, apparatus cooperation, and the like. The apparatus cooperation is a function of causing the air conditioning apparatus 4 and the like located around the image forming apparatus 1 to cooperate with the image forming apparatus 1. The user selects a function to be used and executes each of various functions.

Figure 5:
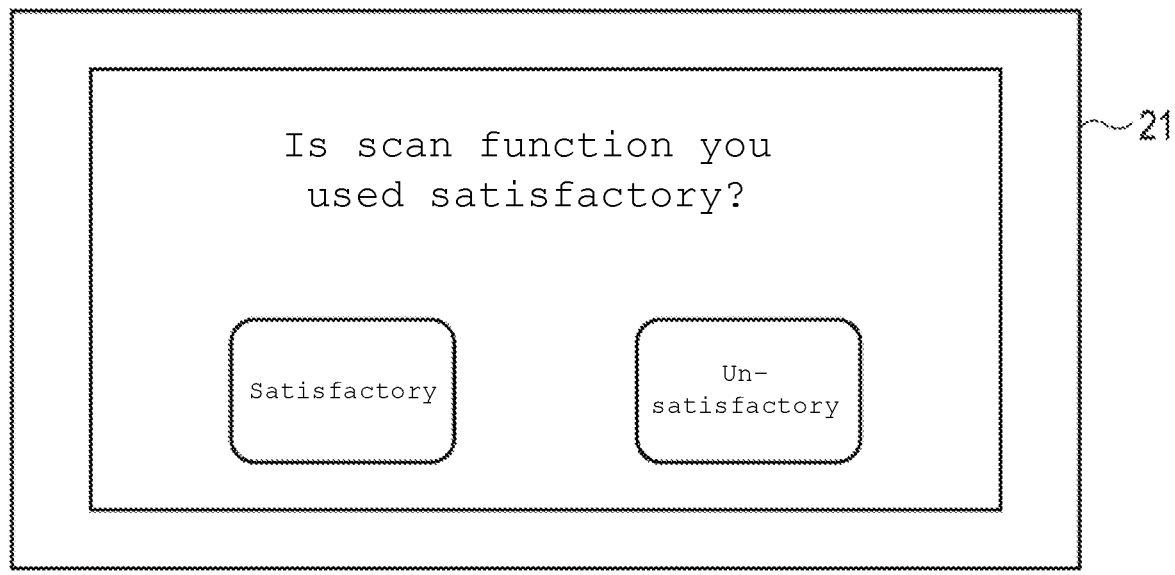
FIG. 5 is a diagram showing an example of a questionnaire image displayed on the touch panel of the image forming apparatus according to the embodiment.

FIG. 5 is a diagram showing an example of a questionnaire image displayed on the touch panel 21 of the image forming apparatus 1 according to the embodiment.

The questionnaire image shown in FIG. 5 includes text information indicating a questionnaire, and answer buttons for inputting an answer to the questionnaire. The text information indicates, for example, "Is the scan function you used satisfactory?" The answer buttons include, for example, a "satisfactory" button and an "unsatisfactory" button. The user performs input for the questionnaire via the answer button to answer the questionnaire.

Figure 6:
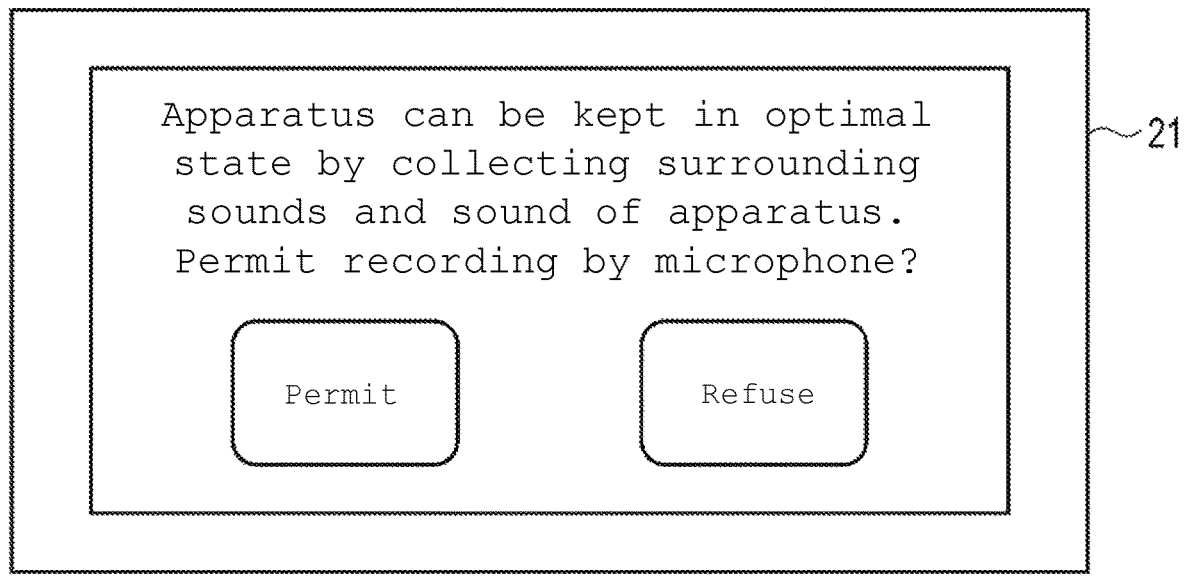
FIG. 6 is a diagram showing an example of a sound acquisition permission/refusal image displayed on the touch panel of the image forming apparatus according to the embodiment.

FIG. 6 is a diagram showing an example of a sound acquisition permission/refusal image displayed on the touch panel 21 of the image forming apparatus 1 according to the embodiment.

The sound acquisition permission/refusal image shown in FIG. 6 includes text information indicating a questionnaire regarding sound acquisition, and answer buttons for inputting an answer to sound acquisition permission/refusal. The text information indicates, for example, "The apparatus can be kept in an optimal state by collecting surrounding sounds and a sound of the apparatus. Permit by the microphone is permitted?" The answer buttons include, for example, a "permit" button and a "refuse" button. The user performs input for sound acquisition via the answer button to answer the questionnaire.

Operation Example

Figure 7:
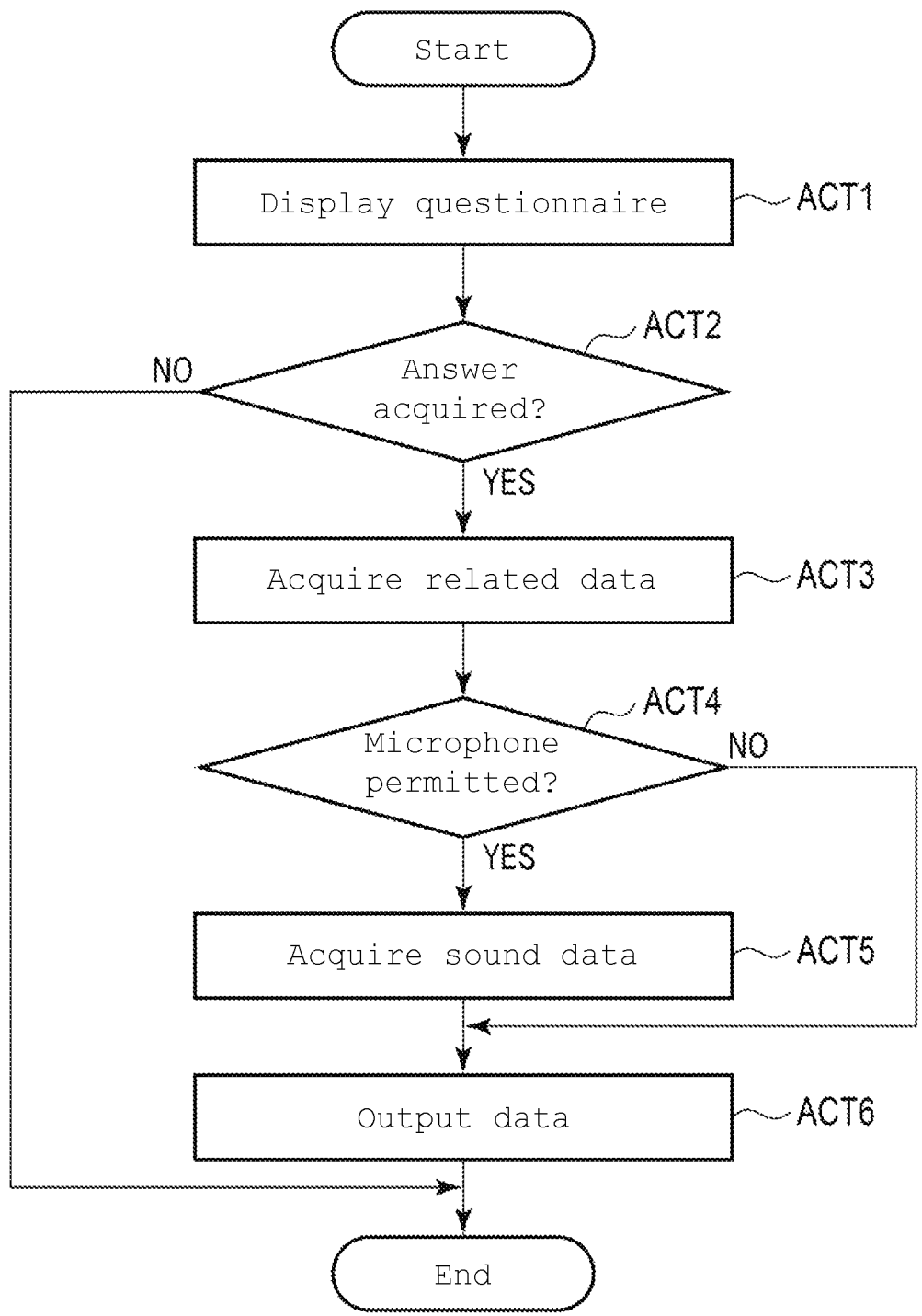
FIG. 7 is a flowchart exemplifying a processing procedure of information processing in the image forming apparatus according to the embodiment.

FIG. 7 is a flowchart exemplifying information processing in the image forming apparatus 1 according to the embodiment. The processing procedure to be described below is merely an example, and each processing step may be changed to the maximum extent. The processing procedure can omit or replace each processing step according to the embodiment and can also add a new processing step.

In the following processing, a case where the user uses the scan function of the image forming apparatus 1 will be described as an example. It is assumed that the user performs input with the selection button indicating the scan function in the function selecting image. After the user uses the scan function, the image forming apparatus 1 performs the following processing.

In ACT1, the display control section 111 of the controller 10 displays a questionnaire regarding the image forming apparatus 1 on the touch panel 21. In ACT1, for example, the display control section 111 detects the user of the scan function by the user on the basis of the input of the selection button indicating the scan function by the user. The display control section 111 displays a questionnaire regarding the scan function of the image forming apparatus 1 on the touch panel 21.

In ACT2, the first acquisition section 112 of the controller 10 determines whether answer data to the questionnaire is acquired or not. In ACT2, for example, the first acquisition section 112 determines whether answer data is acquired or not on the basis of the input to a questionnaire image by the user via the touch panel 21. If the first acquisition section 112 determines that answer data is acquired (ACT2: YES), the processing of the controller 10 proceeds from ACT2 to ACT3. If the first acquisition section 112 determines that answer data is not acquired (ACT2: NO), the processing of the controller 10 is terminated.

In ACT3, the second acquisition section 113 of the controller 10 acquires related data regarding the image forming apparatus 1. In ACT3, for example, the second acquisition section 113 acquires related data regarding the image forming apparatus 1 on the basis of the contents of the answer data. If the answer data is "satisfactory", the second acquisition section 113 may acquire part of the related data. If the answer data is "unsatisfactory", the second acquisition section 113 may acquire all of the related data. For example, a case where the first acquisition section 112 acquires answer data indicating "satisfactory" will be described. The second acquisition section 113 may acquire only the scan-related information in the related data regarding the image forming apparatus 1. The second acquisition section 113 does not necessarily acquire the related data regarding the image forming apparatus 1. A case where the first acquisition section 112 acquires answer data indicating "unsatisfactory" will be described. The second acquisition section 113 may acquire all of the related data regarding the image forming apparatus 1. The second acquisition section 113 does not necessarily acquire part of the related data regarding the image forming apparatus 1. Note that the second acquisition section 113 may acquire all of the related data regardless of the contents of the answer data.

In ACT4, the third acquisition section 114 of the controller 10 determines whether acquisition of sound data around the image forming apparatus 1 is permitted or not. In ACT4, for example, the third acquisition section 114 determines whether sound acquisition is permitted or not by the user on the basis of the input to the sound acquisition permission/refusal image by the user via the touch panel 21. If the third acquisition section 114 determines that acquisition of sound data is permitted (ACT4: YES), the processing of the controller 10 proceeds to ACT4 to ACT5. If the third acquisition section 114 determines that acquisition of sound data is not permitted (ACT4: NO), the processing of the controller 10 proceeds from ACT4 to ACT6.

In ACT5, the third acquisition section 114 of the controller 10 acquires the sound data around the image forming apparatus 1. In ACT5, for example, the third acquisition section 114 acquires data of a voice uttered by the user and data of an operating sound of the image forming apparatus 1 via the microphone 80. The third acquisition section 114 may acquire at least one of the data of a voice uttered by the user or the data of an operating sound of the image forming apparatus 1. In ACT4, if it is determined that acquisition of sound data is not permitted, the third acquisition section 114 may acquire only the data of an operating sound of the image forming apparatus 1. For example, a case where the first acquisition section 112 acquires answer data indicating "satisfactory" will be described. The third acquisition section 114 may acquire only the data of a voice uttered by the user in the sound data. The third acquisition section 114 does not necessarily acquire the sound data regarding the image forming apparatus 1. A case where the first acquisition section 112 acquires answer data indicating "unsatisfactory" will be described. The third acquisition section 114 may acquire all of the sound data. The third acquisition section 114 does not necessarily acquire part of the related data in the sound data. Note that the third acquisition section 114 may acquire all of the sound data regardless of the contents of the answer data.

In ACT6, the transmission section 115 of the controller 10 transmits the acquired data to the server 8 via the input/output interface 50. In ACT6, for example, the transmission section 115 associates the related data with the answer data to transmit the resultant data to the server 8. If the third acquisition section 114 acquires sound data, the transmission section 115 associates the related data and the sound data with the answer data to transmit the resultant data to the server 8. The transmission section 115 may determine data to be transmitted to the server 8, from the acquired related data and sound data, on the basis of the contents of the answer data. For example, a case where the first acquisition section 112 acquires answer data indicating "satisfactory" will be described. The transmission section 115 may transmit only the scan-related information in the acquired related data and sound data to the server 8. The transmission section 115 may transmit only the scan-related information and the data of a voice uttered by the user in the acquired related data and sound data to the server 8. A case where the first acquisition section 112 acquires answer data indicating "unsatisfactory" will be described. The transmission section 115 may transmit all of the acquired related data and sound data to the server 8. The transmission section 115 may transmit part of the acquired related data and sound data. Note that the transmission section 115 may acquire all of the sound data regardless of the contents of the answer data.

The server 8 acquires the data from the transmission section 115 and analyzes a state of the image forming apparatus 1 on the basis of the acquired data. The server 8 automatically updates various settings of the image forming apparatus 1 such that the image forming apparatus 1 is set to an optimal state on the basis of the analysis result. Thus, the server 8 can keep various settings of the image forming apparatus 1 in the optimal state. Note that, if the image forming apparatus 1 performs personal authentication of a user and only when a particular individual uses the image forming apparatus 1, the server 8 may automatically update various settings of the image forming apparatus 1. Thus, the server 8 can control the image forming apparatus 1 such that various settings for use by a particular individual do not affect settings for use by another person. The server 8 can customize various settings of the image forming apparatus 1 to be optimized. Note that if a particular expendable part is close to the end of its life, the server 8 may transmit information prompting an exchange of the expendable part to a service center or the like of a manufacturer on the basis of the analysis result.

Note that the processing procedure described above can also be applied to the case where the user uses a function of the air conditioning apparatus 4. The server 8 acquires data from the transmission section 115 and analyzes a state of the air conditioning apparatus 4 on the basis of the acquired data. The server 8 automatically updates various settings of the air conditioning apparatus 4 such that the air conditioning apparatus 4 is set to an optimal state on the basis of the analysis result. Thus, the server 8 can keep various settings of the air conditioning apparatus 4 in the optimal state. Note that, if the image forming apparatus 1 performs personal authentication of a user and only when a particular individual uses the air conditioning apparatus 4, the server 8 may automatically update various settings of the air conditioning apparatus 4. Thus, the server 8 can control the air conditioning apparatus 4 such that various settings for use by a particular individual do not affect settings for use by another person. The server 8 can customize various settings of the air conditioning apparatus 4 to be optimized.

The embodiment described above has been described by exemplifying the image forming apparatus, but it is not limited thereto. The embodiment is applicable to an apparatus including at least one of a sensor, a camera, or a microphone. The embodiment may be applied to a point-of-sales (POS) apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a control panel that includes a touch panel capable of inputting an instruction based on an operation of a user;
a microphone that acquires sound data around the image forming apparatus;
an input/output interface that transmits various types of data to another apparatus; and
a controller configured to
display a questionnaire regarding an apparatus to the user on the control panel,
acquire answer data to the questionnaire from the user via the touch panel,
acquire related data regarding the apparatus,
display a message on the touch panel asking the user to answer whether or not to allow sound acquisition around the image forming apparatus,
determine whether or not acquisition of sound data around the image forming apparatus is allowed by acquiring the answer whether or not to allow the sound acquisition via the touch panel,
in a case of determining that the acquisition of sound data is allowed, acquire, as related sound data, data of sound generated by the user and data of sound generated by the apparatus from sound data obtained through the microphone,
in a case of determining that the acquisition of sound data is not allowed, acquire, as the related sound data, the data of the sound generated by the apparatus, and not the data of the sound generated by the user, from the sound data obtained through the microphone, and
associate the related data and the related sound data with the answer data to transmit the answer data, the related data, and the related sound data to another apparatus different from the apparatus via the input/output interface.

2. The image forming apparatus according to claim 1, wherein
the apparatus is an apparatus different from the image forming apparatus, and
the questionnaire is a questionnaire regarding the apparatus different from the image forming apparatus.

3. The image forming apparatus according to claim 2, wherein
the other apparatus different from the apparatus is a server that analyzes a state of the apparatus different from the image forming apparatus on a basis of the answer data and updates various settings of the apparatus different from the image forming apparatus on a basis of a result of the analysis.

4. The image forming apparatus according to claim 1, wherein
the apparatus is an apparatus different from the image forming apparatus, and
the other apparatus different from the apparatus is a server that analyzes a state of the image forming apparatus on a basis of the answer data and updates various settings of the image forming apparatus on a basis of a result of the analysis.

5. The image forming apparatus according to claim 1, wherein
the controller determines related data to be transmitted on a basis of contents of the answer data.

6. The image forming apparatus according to claim 1, wherein
the controller determines the related sound data to be transmitted on a basis of contents of the answer data.

7. The image forming apparatus according to claim 1, further comprising
a scanner device, wherein
the controller is configured to
detect use of a scan function of the scanner device by the user, and
display a questionnaire regarding the scan function on the control panel.

8. The image forming apparatus according to claim 7, wherein
the controller is configured to
display a plurality of functions, including the scan function, of the image forming apparatus on the control panel in a selectable manner, and
detect, if the user selects the scan function via the touch panel of the control panel, use of the scan function of the scanner device by the user.

9. An information processing method for an image forming apparatus, comprising:
displaying a questionnaire regarding an apparatus to a user on a control panel;
acquiring answer data to the questionnaire from the user via a touch panel of the control panel;
acquiring related data regarding the apparatus;
displaying a message on the touch panel asking the user to answer whether or not to allow sound acquisition around the image forming apparatus;
determining whether or not acquisition of sound data around the image forming apparatus is allowed by acquiring the answer whether or not to allow the sound acquisition via the touch panel;
in a case of determining that the acquisition of sound data is allowed, acquiring, as related sound data, data of sound generated by the user and data of sound generated by the apparatus from sound data obtained through the microphone;
in a case of determining that the acquisition of sound data is not allowed, acquiring, as the related sound data, the data of the sound generated by the apparatus, and not the data of the sound generated by the user, from the sound data obtained through the microphone; and
associating the related data and the related sound data with the answer data to transmit the answer data, the related data, and the related sound data to another apparatus different from the apparatus via the input/output interface.

* * * * *